US009827556B2

(12) United States Patent
Nagao et al.

(10) Patent No.: US 9,827,556 B2
(45) Date of Patent: Nov. 28, 2017

(54) CATALYST CARRIER FOR EXHAUST GAS PURIFICATION AND CATALYST FOR EXHAUST GAS PURIFICATION

(75) Inventors: Yuki Nagao, Tokyo (JP); Takahiro Sato, Tokyo (JP); Yunosuke Nakahara, Tokyo (JP); Masato Machida, Kumamoto (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 4 days.

(21) Appl. No.: 14/343,056

(22) PCT Filed: Aug. 27, 2012

(86) PCT No.: PCT/JP2012/071550
§ 371 (c)(1),
(2), (4) Date: Mar. 6, 2014

(87) PCT Pub. No.: WO2013/035568
PCT Pub. Date: Mar. 14, 2013

(65) Prior Publication Data
US 2014/0221198 A1    Aug. 7, 2014

(30) Foreign Application Priority Data

Sep. 6, 2011   (JP) ................................. 2011-194239
Apr. 3, 2012   (JP) ................................. 2012-084843

(51) Int. Cl.
*B01J 27/185*   (2006.01)
*B01J 27/18*    (2006.01)
(Continued)

(52) U.S. Cl.
CPC ........ *B01J 27/1856* (2013.01); *B01D 53/945* (2013.01); *B01J 27/1804* (2013.01);
(Continued)

(58) Field of Classification Search
CPC .................................................. B01J 27/1856
See application file for complete search history.

(56) References Cited

U.S. PATENT DOCUMENTS 4,180,551 A * 12/1979 Clearfield ............ B01D 53/944
                                                     423/249
4,791,091 A * 12/1988 Bricker ................ B01D 53/945
                                                     423/213.5
(Continued)

FOREIGN PATENT DOCUMENTS

JP    05-329333    12/1993
JP    06-055075    3/1994
(Continued)

OTHER PUBLICATIONS

English translation of JP 08-150339 Mitsuru pp. 1-4, Jun. 11, 1996.*
(Continued)

*Primary Examiner* — Douglas B Call
(74) *Attorney, Agent, or Firm* — Young & Thompson (57) ABSTRACT

Disclosed is an exhaust gas purification catalyst carrier which includes a phosphate salt represented by formula: $MPO_4$ (wherein M represents Y, La, or Al) or a zirconium phosphate represented by formula $ZrP_2O_7$; an exhaust gas purification catalyst containing a noble metal at least containing Rh and supported on the carrier; and an exhaust gas purification catalyst product having a catalyst support made of a ceramic or metallic material, and a layer of the exhaust gas purification catalyst, the layer being supported on the catalyst support.

4 Claims, 2 Drawing Sheets

(51) Int. Cl.
  *B01D 53/94* (2006.01)
  *B01J 37/02* (2006.01)
  *B01J 37/03* (2006.01)
  *B01J 37/10* (2006.01)

(52) U.S. Cl.
  CPC .......... *B01J 37/0248* (2013.01); *B01J 37/03* (2013.01); *B01D 2255/1025* (2013.01); *B01D 2255/2061* (2013.01); *B01D 2255/2063* (2013.01); *B01J 37/036* (2013.01); *B01J 37/10* (2013.01); *Y02T 10/22* (2013.01)

(56) References Cited

U.S. PATENT DOCUMENTS

| | | | |
|---|---|---|---|
| 5,227,145 A | 7/1993 | Kintaichi et al. | |
| 5,260,241 A | 11/1993 | Addiego et al. | |
| 5,268,506 A * | 12/1993 | Karasawa | B01J 27/1804 562/400 |
| 5,880,057 A | 3/1999 | Hatano | |
| 6,047,544 A * | 4/2000 | Yamamoto | B01D 53/945 422/171 |
| 2004/0007532 A1 * | 1/2004 | Bortun | B01J 27/16 210/660 |
| 2004/0086432 A1 | 5/2004 | LaBarge et al. | |
| 2006/0140826 A1 * | 6/2006 | LaBarge | B01D 53/9454 422/168 |
| 2006/0293175 A1 * | 12/2006 | Dai et al. | 502/208 |
| 2008/0292513 A1 * | 11/2008 | Miyairi | B01D 53/944 422/180 |
| 2014/0213439 A1 | 7/2014 | Yamaguchi et al. | |

FOREIGN PATENT DOCUMENTS

| | | |
|---|---|---|
| JP | 06171915 | 6/1994 |
| JP | 08-150339 | 6/1996 |
| JP | 09155196 | 6/1997 |
| JP | 09187656 | 7/1997 |
| JP | 11-267509 | 10/1999 |
| JP | 2000-042415 | 2/2000 |
| JP | 2000-128537 | 5/2000 |
| JP | 2003-020227 | 1/2003 |
| JP | 2010000440 | 1/2010 |
| JP | 2013052343 | 3/2013 |
| WO | WO 2009/142180 | 11/2009 |

OTHER PUBLICATIONS

Sigma-Aldrich Product Specification sheet for zirconium phosphate Product No. 464236 1 page, downloaded Aug. 1, 2016.*
Japanese Office Action, dated Jan. 27, 2015, in corresponding Japanese Patent Application No. 2012-084843.
Takahiro Sato, et al. "Exhaust Gas Purification Characteristics of Rh-on-AlPo4 Catalyst," pp. 50-51.
International Search Report in corresponding International Application No. PCT/JP2012/071550.
Kyosuke Murakami et al., "Development of Nobel-Metal-Saving Catalyst Employing Phosphate Salt Carrier (1)", Proceedings, 103rd Catalyst annual meetings, Mar. 30, 2009, p. 70 and an English translation of the relevant parts.
Extended European Search Report, dated Jul. 9, 2015, in corresponding European Patent Application No. 12830154.6.
Japanese Office Action dated Sep. 7, 2016 in corresponding Japanese Patent Application No. 2015-217915.

* cited by examiner

CATALYST CARRIER FOR EXHAUST GAS PURIFICATION AND CATALYST FOR EXHAUST GAS PURIFICATION

TECHNICAL FIELD

The present invention relates to an exhaust gas purification catalyst carrier and to an exhaust gas purification catalyst. More particularly, the invention relates to an exhaust gas purification catalyst carrier which effectively serves as an exhaust gas purification catalyst carrier for supporting Rh, the Rh-supporting exhaust gas purification catalyst exhibiting high $NO_x$ removal, activity at an excess air ratio λ more than 1; i.e., under a stoichiometric condition to a lean condition, and also exhibiting remarkably improved catalytic performance as compared with that of an Rh-supporting zirconia, and to such an exhaust gas purification catalyst.

BACKGROUND ART

Exhaust gas discharged from an internal combustion engine of, for example, an automobile contains toxic components such as hydrocarbons (HC), carbon monoxide (CO), and nitrogen oxides ($NO_x$). Hitherto, three-way catalysts have been used for removing such toxic components for detoxifying the exhaust gas.

Such a three-way catalyst employs a noble metal such as Pt, Pd, or Rh serving as a catalytic active component; alumina, ceria, zirconia, a ceria-zirconia complex oxide having an oxygen-occluding ability, or the like serving as a carrier; and a catalyst support which is made of a ceramic or metallic material and which is in the form of a honeycomb, a plate, a pellet, or the like. Generally, when the excess air ratio λ is approximately 1, three-way catalysts employed in gasoline automobiles can maintain very high performance of removing CO, HC, and NO, whereas when the excess air ratio λ is higher than 1 (i.e., under a lean condition), the $NO_x$ removal performance drops considerably due to excessive oxygen. In order to improve the $NO_x$ removal performance when the excess air ratio λ is higher than 1 (i.e., under a lean condition), an $NO_x$ trapping catalyst is generally employed. However, it has been known that when high-sulfur-content gasoline is used, the catalyst is prone to undergo poisoning with S, resulting in a drop in $NO_x$ trapping performance.

There has been proposed an exhaust gas purification catalyst which can remove $NO_x$ at high efficiency while minimizing formation of $N_2O$ even under an exhaust gas having a low HC/$NO_x$ ratio. The proposed catalyst has a double-layer structure which includes a first catalyst layer containing, as a carrier, a phosphate salt (e.g., magnesium phosphate, silver phosphate, nickel phosphate, copper phosphate, iron phosphate, zinc phosphate, or tin phosphate) having excellent S-poisoning resistance and serving as an HC-reforming material; and a second catalyst layer containing Rh-supporting and $WO_3$-modified alumina (or silica-alumina). In operation, partial oxidation of HC contained in the exhaust gas by the HC-reforming material is catalyzed at an air fuel ratio under a lean condition, to thereby form oxide-containing compounds (see Patent Document 1). There has also been proposed an $NO_x$ removal catalyst having a carrier formed of at least one compound selected from a metal carbonate, a metal sulfate, and a metal phosphate, and iridium serving as an active metal supported on the carrier (see Patent Document 2).

PRIOR ART DOCUMENTS

Patent Documents

Patent Document 1: Japanese Patent Application Laid-Open (kokai) No. 2000-042415
Patent Document 2: Japanese Patent Application Laid-Open (kokai) No. Hei 11-267509

SUMMARY OF THE INVENTION

Problems to be Solved by the Invention

However, all the phosphate salts employed in the invention disclosed in Patent Document 1, having a low BET value, must be deposited on a high-BET carrier material such as alumina or β-zeolite and dispersed to a high degree. Also, the catalyst disclosed in Patent Document 1 has a complicated double layer structure. The catalyst of the invention disclosed in Patent Document 2 uses iridium as an active metal, thereby making the durability of the catalyst unsatisfactory.

Thus, an object of the present invention is to provide a novel exhaust gas purification catalyst carrier; in particular, an exhaust gas purification catalyst carrier which effectively serves as an exhaust gas purification catalyst carrier for supporting Rh, the Rh-supporting exhaust gas purification catalyst exhibiting high $NO_x$ removal activity at an excess air ratio λ more than 1; i.e., under a stoichiometric condition to a lean condition, and also exhibiting remarkably improved catalytic performance as compared with that of an Rh-supporting zirconia. Another object of the invention is to provide such an exhaust gas purification catalyst. Meanwhile, the excess air ratio λ is a factor indicating the ratio of the actual amount of contained air to the theoretical (stoichiometric) air fuel ratio. When λ is 1, the condition is stoichiometric; when λ is less than 1, the condition is rich; and when λ is more than 1, the condition is lean. The value λ(O/R) may be converted to the corresponding air fuel ratio (A/F) from the graph disclosed in the document SAE Paper Number 950256. When the excess air ratio λ is the theoretical air fuel ratio (λ=1, stoichiometric), the air fuel ratio A/F corresponds to a theoretical air fuel ratio A/F of 14.6.

Means for Solving the Problems

The present inventors have conducted extensive studies in order to attain the aforementioned objects, and have found that use of a phosphate salt represented by formula $MPO_4$ (wherein M represents Y, La, or Al) or a zirconium phosphate represented by formula $ZrP_2O_7$, having excellent S-poisoning resistance, as a carrier for Rh, results in production of an exhaust gas purification catalyst exhibiting high $NO_x$ removal activity at an excess air ratio λ more than 1; i.e., under a stoichiometric condition to a lean condition, and also exhibiting remarkably improved catalytic performance as compared with that of an Rh-supporting zirconia. The present invention has been accomplished on the basis of this finding.

Accordingly, the present invention is directed to an exhaust gas purification catalyst carrier, characterized by comprising a phosphate salt represented by formula:

$$MPO_4$$

(wherein M represents Y, La, or Al) or a zirconium phosphate represented by formula $ZrP_2O_7$.

Particularly, the catalyst carrier preferably contains a phosphate salt represented by formula:

$MPO_4$ (wherein M represents Y or La).

More preferably, the catalyst carrier further contains $SiO_2$.

The exhaust gas purification catalyst of the present invention is characterized by having a carrier comprising a phosphate salt represented by formula:

$MPO_4$ (wherein M represents Y, La, or Al) or a zirconium phosphate represented by formula $ZrP_2O_7$, and a noble metal at least containing Rh and supported on the carrier.

Also, the exhaust gas purification catalyst of the present invention is characterized by having a carrier comprising a phosphate salt represented by formula:

$MPO_4$ (wherein M represents Y or La), and a noble metal at least containing Rh and supported on the carrier.

Particularly, the carrier more preferably contains $SiO_2$.

The exhaust gas purification catalyst product of the present invention is characterized by having a catalyst support made of a ceramic or metallic material, and a layer of the exhaust gas purification catalyst of the present invention, the layer being supported on the catalyst support.

Effects of the Invention

The exhaust gas purification catalyst of the present invention exhibits high $NO_x$ removal activity in an excess air ratio λ range of 1 to more than 1; i.e., under a stoichiometric condition to a lean condition, and also exhibits remarkably improved catalytic performance as compared with that of an Rh-supporting zirconia.

MODES FOR CARRYING OUT THE INVENTION

The exhaust gas purification catalyst carrier of the present invention is formed of a phosphate salt represented by formula:

$MPO_4$ (wherein M represents Y, La, or Al) or a zirconium phosphate represented by formula $ZrP_2O_7$ (both phosphate salts may also be referred to as the phosphate salt of the present invention).

The phosphate salt represented by formula $MPO_4$ and the zirconium phosphate represented by formula $ZrP_2O_7$ may be produced through a known co-precipitation method, as described in the Referential Example hereinbelow.

Preferably, the exhaust gas purification catalyst carrier of the present invention further contains $SiO_2$. The exhaust gas purification catalyst carrier containing $SiO_2$ may be produced by mixing a powder of the phosphate salt of the present invention with an $SiO_2$ powder. Alternatively, the $SiO_2$-containing catalyst carrier may be produced through hydrothermal synthesis of the phosphate salt in the presence of an $SiO_2$ powder. Among the phosphate salts of the present invention, a phosphate salt including lanthanum phosphate is particularly preferred.

The exhaust gas purification catalyst carrier containing $SiO_2$ exhibits further improved heat resistance, as compared with the aforementioned carrier formed of the phosphate salt. Particularly when the phosphate salt is dispersed and supported on $SiO_2$ particles, burying of the supported noble metal into the carrier is suppressed even after heat treatment under high-temperature conditions. Also, even after long-term use of the catalyst under high-temperature conditions, a drop in CO-, HC-, and $NO_x$-activating performance at low temperature is suppressed.

In the case where the phosphate salt is lanthanum phosphate, the ratio of the amount of the phosphate salt to that of the total amount of $SiO_2$ and the phosphate salt, hereinafter abbreviated as $LaPO_4/SiO_2$, is preferably 5 to 40 mol %.

The exhaust gas purification catalyst of the present invention contains a noble metal such as Rh supported on a carrier formed of the phosphate salt represented by formula $MPO_4$ or a zirconium phosphate represented by formula $ZrP_2O_7$. Particularly when Rh is deposited on the carrier, the exhaust gas purification catalyst exhibits high $NO_x$ removal activity in an excess air ratio λ range of 1 to more than 1; i.e., under a stoichiometric condition to a lean condition, and also exhibits remarkably improved catalytic performance as compared with that of an Rh-supporting zirconia. The amount of Rh supported on the carrier, as reduced to the mass of metallic Rh and based on the mass of the carrier, is preferably 0.05 to 2 mass %, more preferably 0.1 to 1 mass %. When the amount of Rh supported on the carrier, as reduced to the mass of metallic Rh and based on the mass of the carrier, is less than 0.05 mass %, the catalytic activity is poor due to such a small amount of the noble metal, whereas when the amount of Rh is in excess of 2 mass %, deposition of the noble metal with high dispersion degree may fail to be attained due to such an excess amount of noble metal.

The exhaust gas purification catalyst of the present invention may be produced through, for example, the following procedure. Firstly, the phosphate salt represented by formula $MPO_4$ or the zirconium phosphate represented by formula $ZrP_2O_7$ is mixed with an Rh compound (e.g., hexaammine Rh hydroxide solution) at such a ratio that the amount of supported Rh as reduced to the mass of metallic Rh and on the basis of the mass of the carrier is adjusted to preferably 0.05 to 2 mass %. Then, the mixture is evaporated to dryness, and the dried product is fired at 450 to 650° C.

The exhaust gas purification catalyst product of the present invention has a catalyst support made of a ceramic or metallic material, and a layer of the exhaust gas purification catalyst of the present invention formed on the catalyst support, wherein the catalyst is supported on the catalyst support. In the exhaust gas purification catalyst product, no particular limitation is imposed on the shape of the catalyst support made of a ceramic or metallic material, and the catalyst support is generally in the form of honeycomb, plate, pellet, or the like. In the case of honeycomb-shape catalyst support, the amount of the exhaust gas purification catalyst to be supported on the catalyst support is preferably 70 to 300 g/L, more preferably 100 to 250 g/L. When the catalyst amount is less than 70 g/L, durability of the catalyst product tends to decrease due to insufficient amount of catalyst. Examples of the material of the catalyst support include ceramic materials such as alumina ($Al_2O_3$), mullite ($3Al_2O_3$-$2SiO_2$), and cordierite ($2MgO$-$2Al_2O_3$-$5SiO_2$), and metallic materials such as stainless steel.

The exhaust gas purification catalyst product of the present invention may be produced through, for example, the following procedure. Firstly, a phosphate salt represented by the aforementioned formula $MPO_4$ or a zirconium phosphate represented by formula $ZrP_2O_7$ in an amount of 50 to 70 parts by mass (preferably 60 to 70 parts by mass), La-stabilized alumina in an amount of 20 to 40 parts by mass (preferably 20 to 30 parts by mass), and an alumina binder in an amount of 5 to 10 parts by mass are added to a solution of hexaammine Rh hydroxide salt and mixed, and the mixture is subjected to wet crushing, to thereby prepare an Rh-containing slurry. In the preparation of the slurry, Rh nitrate is added so that the amount of Rh, with respect to the solid content, is adjusted to 0.1 to 0.5 mass %, preferably 0.1 to 0.2 mass %. Through a known technique, the thus-produced slurry is applied onto a catalyst support made of a ceramic or metallic material (preferably, a honeycomb-shape catalyst support), such that the amount of the exhaust gas purification catalyst is preferably adjusted to 70 to 300 g/L (more preferably, 100 to 250 g/L), dried, and fired at 450 to 650° C., to thereby yield an exhaust gas purification catalyst product including a catalyst support, and a layer of the exhaust gas purification catalyst supported on the catalyst support.

The present invention will next be described in detail by way of Production Examples, Examples, and Comparative Examples.

Production Example 1

Synthesis of Aluminum Phosphate ($AlPO_4$)
(Co-Precipitation Method)

Aluminum nitrate nanohydrate was dissolved in pure water in such an amount that a target concentration was attained. Phosphoric acid was added to the solution. To the resultant solution, 10 mass % aqueous ammonia was slowly added dropwise, to thereby adjust the pH of the solution to 4.5 to 10 (preferably 4.5 to 9). The thus-formed gel-like product was washed with pure water and filtered. The filtration residue was dried overnight at 120° C. The dried product was fired in air at 1,000° C. for 25 hours, to thereby yield aluminum phosphate ($AlPO_4$).

Production Example 2

Synthesis of Yttrium Phosphate ($YPO_4$)
(Co-Precipitation Method)

Yttrium nitrate solution and phosphoric acid were mixed at such a ratio that the target concentration was attained. To the resultant solution, 10 mass % aqueous ammonia was slowly added dropwise, to thereby adjust the pH of the solution to 6 to 10 (preferably 6 to 9). The thus-formed gel-like product was washed with pure water and filtered. The filtration residue was dried overnight at 120° C. The dried product was fired in air at 800° C. for 5 hours, to thereby yield yttrium phosphate ($YPO_4$).

Production Example 3

Synthesis of Lanthanum Phosphate ($LaPO_4$)
(Co-Precipitation Method)

Lanthanum nitrate solution and phosphoric acid were mixed at such a ratio that the target concentration was attained. To the resultant solution, 10 mass % aqueous ammonia was slowly added dropwise, to thereby adjust the pH of the solution to 6 to 10 (preferably 6 to 9). The thus-formed gel-like product was washed with pure water and filtered. The filtration residue was dried overnight at 120° C. The dried product was fired in air at 800° C. for 5 hours, to thereby yield lanthanum phosphate ($LaPO_4$).

Production Example 4

Synthesis of Zirconium Phosphate ($ZrP_2O_7$)
(Co-Precipitation Method)

Zirconium nitrate dihydrate was dissolved in pure water in such an amount that a target concentration was attained. Phosphoric acid was added to the solution. To the resultant solution, 10 mass % aqueous ammonia was slowly added dropwise, to thereby adjust the pH of the solution to 4.5 to 10 (preferably 4.5 to 9). The thus-formed gel-like product was washed with pure water and filtered. The filtration residue was dried overnight at 120° C. The dried product was fired in air at 900° C. for 5 hours, to thereby yield zirconium phosphate ($ZrP_2O_7$).

Production Example 5

Synthesis of Lanthanum Phosphate ($LaPO_4$)
(Hydrothermal Synthesis Method)

Lanthanum nitrate solution and phosphoric acid were mixed at such a ratio that the target concentration was attained. To the resultant solution, 10 mass % aqueous ammonia was slowly added dropwise, to thereby adjust the pH of the solution to 7 to 12 (preferably 8 to 12). The thus-formed gel-like product was subjected to hydrothermal treatment at 200° C. for 24 hours. The product was washed with pure water and filtered. The filtration residue was dried and then fired in air at 1,000° C. for 5 hours, to thereby yield lanthanum phosphate ($LaPO_4$).

Production Example 6

Synthesis of Lanthanum Phosphate ($LaPO_4$)/$SiO_2$
Carrier (Hydrothermal Synthesis Method)

Lanthanum nitrate solution and phosphoric acid were mixed at such a ratio that the target concentration was attained. To the resultant solution, particulate $SiO_2$ was added, and 10 mass % aqueous ammonia was slowly added dropwise to the mixture, to thereby adjust the pH of the mixture to 7 to 12 (preferably 8 to 12). The thus-formed gel-like product was subjected to hydrothermal treatment at 200° C. for 24 hours. The product was washed with pure water and filtered. The filtration residue was dried and then fired in air at 1,000° C. for 5 hours, to thereby yield a carrier in which lanthanum phosphate ($LaPO_4$) was dispersed and supported on $SiO_2$ particles.

Example 1

Rh-Supporting Aluminum Phosphate

The aluminum phosphate carrier prepared in Production Example 1 was immersed in aqueous hexaammine Rh hydroxide solution in such an amount that the supported Rh concentration as reduced to the mass of metallic Rh and on the basis of the mass of the carrier was adjusted to 1.0 mass %. Subsequently, the mixture was evaporated to dryness, and the recovered solid was fired, to thereby yield an exhaust gas purification catalyst falling within the scope of the present invention (Rh-supporting aluminum phosphate).

Example 2

Rh-Supporting Yttrium Phosphate

The yttrium phosphate carrier prepared in Production Example 2 was immersed in aqueous hexaammine Rh hydroxide solution in such an amount that the supported Rh concentration as reduced to the mass of metallic Rh and on the basis of the mass of the carrier was adjusted to 1.0 mass. Subsequently, the mixture was evaporated to dryness, and the recovered solid was fired, to thereby yield an exhaust gas purification catalyst falling within the scope of the present invention (Rh-supporting yttrium phosphate).

Example 3

Rh-Supporting Lanthanum Phosphate

The lanthanum phosphate carrier prepared in Production Example 3 was immersed in aqueous hexaammine Rh hydroxide solution in such an amount that the supported Rh concentration as reduced to the mass of metallic Rh and on the basis of the mass of the carrier was adjusted to 1.0 mass %. Subsequently, the mixture was evaporated to dryness, and the recovered solid was fired, to thereby yield an exhaust gas purification catalyst falling within the scope of the present invention (Rh-supporting lanthanum phosphate).

Example 4

Rh-Supporting Zirconium Phosphate

The zirconium phosphate carrier prepared in Production Example 4 was immersed in aqueous hexaammine Rh hydroxide solution in such an amount that the supported Rh concentration as reduced to the mass of metallic Rh and on the basis of the mass of the carrier was adjusted to 1.0 mass %. Subsequently, the mixture was evaporated to dryness, and the recovered solid was fired, to thereby yield an exhaust gas purification catalyst falling within the scope of the present invention (Rh-supporting zirconium phosphate).

Comparative Example 1

Rh-Supporting Zirconia

A commercial product of zirconia powder was immersed in aqueous Rh nitrate solution in such an amount that the supported Rh concentration as reduced to the mass of metallic Rh and on the basis of the mass of the carrier was adjusted to 1.0 mass %. Subsequently, the mixture was evaporated to dryness, and the recovered solid was fired, to thereby yield an exhaust gas purification catalyst of Comparative Example (Rh-supporting zirconia).

FT-IR Measurement

Each of the Rh-supporting samples produced in Examples 1 to 4 and Comparative Example 1 in an unused state was charged into a sample cell. The cell was maintained under a stream of $N_2$ at 600° C. for 30 minutes, and the temperature was lowered to 300° C. Subsequently, 3,300 ppmC $C_3H_6$ and 0.6% $O_2$ were fed into the sample cell for 30 minutes. HC species adsorbed on the catalyst were observed through FT-IR. The observation and evaluation of the results were carried out by means of FT/IR-6200 and a diffuse reflection meter DR-400 (products of JASCO Corporation).

<Results of FT-IR Measurement>

Figure 1:
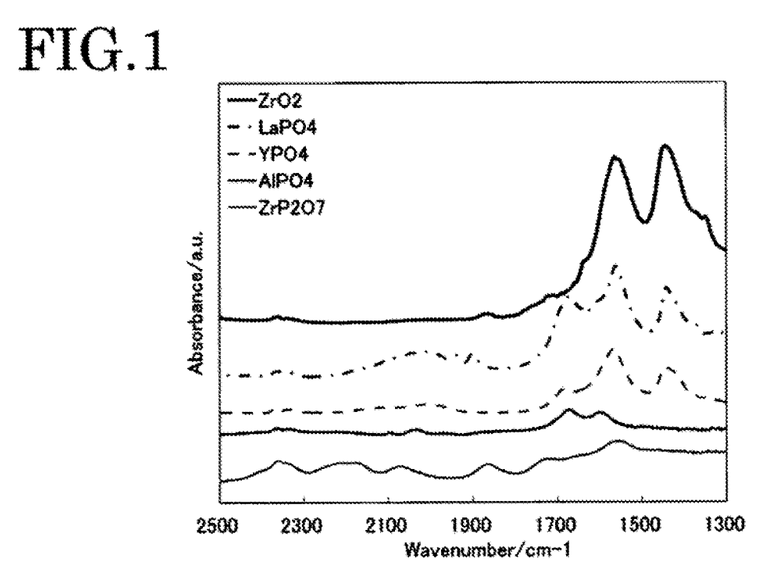
FIG. 1 An FT-IR spectra of Rh-supporting fresh (unused) samples.

FIG. 1 shows the results of FT-IR measurement. As shown in FIG. 1, in the case of the $ZrO_2$ carrier, an adsorbed species assigned to a carboxylate anion, and a CO species adsorbed on Rh in a bridge manner were observed, indicating that $C_3H_6$ was partially oxidized. In the cases of the $LaPO_4$ carrier and the $YPO_4$ carrier, an adsorbed species assigned to Aryl-CHO aldehyde was observed in addition to a carboxylate anion. In both cases, a CO species adsorbed on Rh in a linear manner was observed, indicating that $C_3H_6$ was partially oxidized. In the case of the $AlPO_4$ carrier, an adsorbed species assigned to a carboxylate anion was not observed, and an adsorbed species assigned to Aryl-CHO aldehyde and a CO species adsorbed on Rh in a linear manner were observed, indicating that $C_3H_6$ was partially oxidized. In the case of the $ZrP_2O_7$ carrier, an adsorbed species assigned to a carboxylate anion was not observed, and an adsorbed species assigned to R—CHO aldehyde and a CO species adsorbed on Rh in a bridge/linear manner were observed, indicating that $C_3H_6$ was partially oxidized.

Example 5

Rh-Supporting Aluminum Phosphate, Rh Single Layer, 0.15 g/L

The aluminum phosphate carrier produced in Production Example 1 (73 parts by mass), La-stabilized alumina (21 parts by mass), and an alumina binder (6 parts by mass) were added to a solution of hexaammine Rh hydroxide salt, and the mixture was subjected to wet crushing, to thereby prepare an Rh-containing slurry. In the preparation of the slurry, Rh nitrate solution was added so that the amount of Rh, with respect to the solid content, was adjusted to 0.15 mass %. The thus-produced slurry was applied onto a ceramic honeycomb support in a coating amount of 100 g/L, dried, and fired, to thereby yield an exhaust gas purification catalyst product (a honeycomb catalyst) falling within the scope of the present invention.

Example 6

Rh-Supporting Yttrium Phosphate, Rh Single Layer, 0.15 g/L

The yttrium phosphate carrier produced in Production Example 2 (73 parts by mass), La-stabilized alumina (21 parts by mass), and an alumina binder (6 parts by mass) were added to a solution of hexaammine Rh hydroxide salt, and the mixture was subjected to wet crushing, to thereby prepare an Rh-containing slurry. In the preparation of the slurry, Rh nitrate solution was added so that the amount of Rh, with respect to the solid content, was adjusted to 0.15 mass %. The thus-produced slurry was applied onto a ceramic honeycomb support in a coating amount of 100 g/L, dried, and fired, to thereby yield an exhaust gas purification catalyst product (a honeycomb catalyst) falling within the scope of the present invention.

Example 7

Rh-Supporting Lanthanum Phosphate, Rh Single Layer, 0.15 g/L

The lanthanum phosphate carrier produced in Production Example 3 (73 parts by mass), La-stabilized alumina (21 parts by mass), and an alumina binder (6 parts by mass) were added to a solution of hexaammine Rh hydroxide salt, and the mixture was subjected to wet crushing, to thereby prepare an Rh-containing slurry. In the preparation of the slurry, Rh nitrate solution was added so that the amount of Rh, with respect to the solid content, was adjusted to 0.15 mass %. The thus-produced slurry was applied onto a ceramic honeycomb support in a coating amount of 100 g/L, dried, and fired, to thereby yield an exhaust gas purification catalyst product (a honeycomb catalyst) falling within the scope of the present invention.

Example 8

Rh-Supporting Zirconium Phosphate, Rh Single Layer, 0.15 g/L

The zirconium phosphate carrier produced in Production Example 4 (73 parts by mass), La-stabilized alumina (21 parts by mass), and an alumina binder (6 parts by mass) were added to a solution of hexaammine Rh hydroxide salt, and the mixture was subjected to wet crushing, to thereby prepare an Rh-containing slurry. In the preparation of the slurry, Rh nitrate solution was added so that the amount of Rh, with respect to the solid content, was adjusted to 0.15 mass %. The thus-produced slurry was applied onto a ceramic honeycomb support in a coating amount of 100 g/L, dried, and fired, to thereby yield an exhaust gas purification catalyst product (a honeycomb catalyst) falling within the scope of the present invention.

Comparative Example 2

Rh-Supporting Zirconia, Rh Single Layer, 0.15 g/L $ZrO_2$ powder (73 parts by mass), La-stabilized alumina (21 parts by mass), and an alumina binder (6 parts by mass) were added to a solution of Rh nitrate, and the mixture was subjected to wet crushing, to thereby prepare an Rh-containing slurry. In the preparation of the slurry, Rh nitrate solution was added so that the amount of Rh, with respect to the solid content, was adjusted to 0.15 mass %. The thus-produced slurry was applied onto a ceramic honeycomb support in a coating amount of 100 g/L, dried, and fired, to thereby yield an exhaust gas purification catalyst product (a honeycomb catalyst) of Comparative Example.

<Catalyst Performance Evaluation Method>

The produced honeycomb catalysts were evaluated in terms of light-off performance under a lean condition (excess air ratio $\lambda > 1$) through the following procedure. A simulated exhaust gas ($\lambda = 1.2$) consisting of NO (1,000 ppm), $C_3H_6$ (1,650 ppmC), $O_2$ (0.25%), and $H_2O$ (10), the balance being $N_2$, was caused to pass through each of the ceramic honeycomb catalysts of Examples 5 to 8 and Comparative Example 2 at an SV of 100,000 $h^{-1}$. The outlet gas was analyzed at 100 to 500° C. by means of a CO/HC/NO analyzer (product of Best Sokki, Ltd., Exhaust Gas Analyzer SESAM3-N, BEX-5200C). The light-off performance of the catalyst was evaluated. From the results, the temperature at which 30% percent removal $C_3H_6$ or NO was attained (T30) and percent purification at 400° C. ($\eta 400$) were calculated, to thereby compare the performances of the tested Rh-supporting catalysts.

The honeycomb catalysts were also evaluated at different excess oxygen ratios $\lambda$ (air fuel ratios A/F) under scanning conditions. Specifically, a perfect-combustion-simulated exhaust gas consisting of CO, $CO_2$, $C_3H_6$, $H_2$, $O_2$, NO, and $H_2O$, the balance being $N_2$, was caused to pass through each of the ceramic honeycomb catalysts of Examples 5 to 8 and Comparative Example 2 at an SV of 100,000 $h^{-1}$, while the $\lambda$ was varied from 0.4 to 1.5 (A/F=14.2 to 14.8) (with variation in $CO/H_2$ level, and $O_2$ level). The outlet gas was analyzed at 400° C. by means of a CO/HC/NO analyzer (product of HORIBA Ltd., MOTOR EXHAUST GAS ANALYZER MEXA 9100), to thereby compare the performances of the tested Rh-supporting catalysts.

The honeycomb catalysts which had been used for a long term under high-temperature conditions were evaluated in terms of light-off performance and under different excess oxygen ratios $\lambda$ (air fuel ratios A/F) in a simulated gas containing 10% steam, to thereby compare the performances of the tested catalysts. In the high-temperature condition test, a catalyst was placed in an electric furnace maintained at 800° C., and a gas mixture of $C_3H_6$ and $O_2$ or CO and $O_2$ (perfect combustion ratio) and air were periodically (each for 50 seconds) and alternatingly fed to the furnace. The total treatment time was 50 hours.

<Results of L/O Performance Evaluation by Use of Simulated Exhaust Gas>

Figure 2:
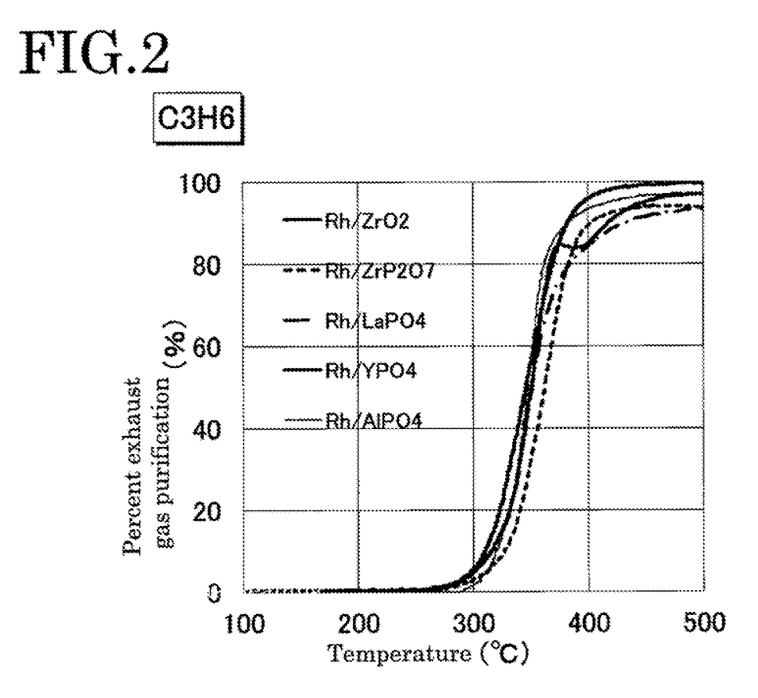
FIG. 2 A graph showing an L/O performance (percent $C_3H_6$ removal) of samples at an excess air ratio λ of 1.2 (air fuel ratio A/F of 14.7) (under a lean condition).
Figure 3:
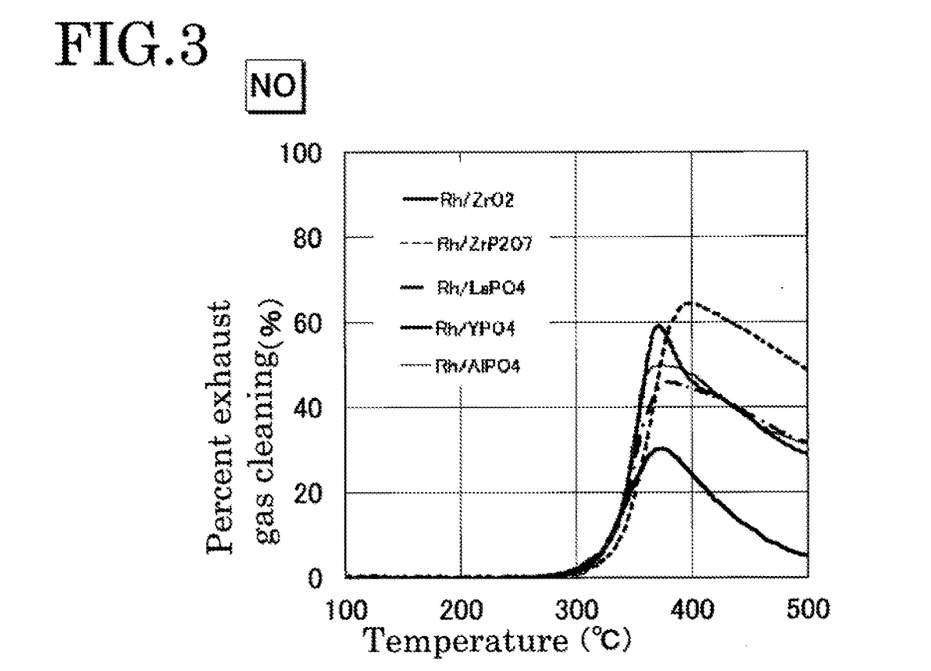
FIG. 3 A graph showing an L/O performance (percent NO removal) of samples at an excess air ratio λ of 1.2 (air fuel ratio A/F of 14.7) (under a lean condition).
Figure 4:
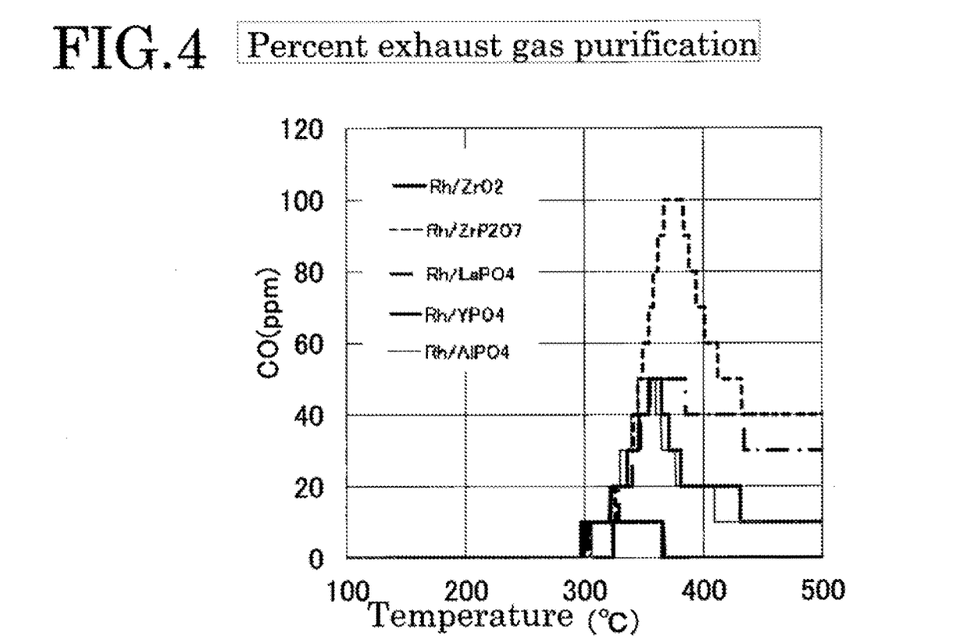
FIG. 4 A graph showing an L/O performance (formed CO concentration) of samples at an excess air ratio λ of 1.2 (air fuel ratio A/F of 14.7) (under a lean condition).

FIGS. 2 to 4 show the NO—$C_3H_6$ reaction features of the tested samples under a lean condition (excess air ratio $\lambda = 1.2$ (air fuel ratio A/F=14.7)), the reaction features including percent removal of $C_3H_6$, percent removal of NO, and formed CO concentration. When a specific phosphate salt was used as an Rh carrier, all the tested samples exhibited an $NO_x$ removal performance at high temperature which was remarkably improved and higher than that of an Rh-supporting zirconia. Also, as shown in the FT-IR chart, formation of CO, conceivably attributed to partial oxidation of $C_3H_6$, was observed when the tested phosphate salts were used. Among them, when $ZrP_2O_7$ was used, the formed CO concentration was highest. Conceivably, $NO_x$ removal proceeds via partial oxidation products (e.g., CO and intermediates).

Table 1 shows the L/O performance of the tested samples at an excess air ratio $\lambda$ of 1.2 (air fuel ratio A/F=14.7).

TABLE 1

|  | T30/° C. | | η400/% | |
| --- | --- | --- | --- | --- |
|  | $C_3H_6$ | NO | $C_3H_6$ | NO |
| $ZrO_2$ | 331 | 369 | 95.8 | 24.3 |
| $ZrP_2O_7$ | 348 | 359 | 89.3 | 64.4 |
| $LaPO_4$ | 340 | 353 | 84.2 | 44.4 |
| $YPO_4$ | 339 | 349 | 84.9 | 46.2 |
| $AlPO_4$ | 339 | 348 | 93.4 | 47.6 |

<Results of Performance Evaluation Under Excess Oxygen Ratio λ (Air Fuel Ratio A/F) Scanning Conditions by use of Simulated Exhaust Gas>

Tables 2, 3, and 4 show the purification performances of the samples under excess oxygen ratio λ (air fuel ratio A/F) scanning conditions.

TABLE 2

(CO-η400 data)

| A/F | 14.2 | 14.4 | 14.5 | 14.6 | 14.7 | 14.8 |
|---|---|---|---|---|---|---|
| λ (O excess) | 0.4 | 0.7 | 0.8 | 1.0 | 1.2 | 1.5 |
| Rh/ZrO$_2$ | 61.2 | 86.8 | 93.4 | 98.6 | 98.2 | 98.4 |
| Rh/ZrP$_2$O$_7$ | 25.6 | 44.3 | 74.4 | 94.3 | 93.8 | 93.2 |
| Rh/LaPO$_4$ | 29.8 | 52.2 | 82.7 | 97.3 | 96.4 | 95.5 |
| Rh/YPO$_4$ | 28.9 | 53.7 | 85.0 | 95.9 | 95.5 | 95.2 |
| Rh/AlPO$_4$ | 25.0 | 45.0 | 76.0 | 95.0 | 94.8 | 94.7 |

TABLE 3

(HC-η400 data)

| A/F | 14.2 | 14.4 | 14.5 | 14.6 | 14.7 | 14.8 |
|---|---|---|---|---|---|---|
| λ (O excess) | 0.4 | 0.7 | 0.8 | 1.0 | 1.2 | 1.5 |
| Rh/ZrO$_2$ | 98.3 | 99.0 | 99.2 | 98.1 | 97.2 | 96.7 |
| Rh/ZrP$_2$O$_7$ | 77.4 | 92.8 | 95.4 | 93.9 | 89.3 | 84.1 |
| Rh/LaPO$_4$ | 87.6 | 96.5 | 98.2 | 94.5 | 88.1 | 82.7 |
| Rh/YPO$_4$ | 90.9 | 95.8 | 96.7 | 94.9 | 91.7 | 88.5 |
| Rh/AlPO$_4$ | 88.0 | 96.0 | 97.0 | 95.4 | 89.7 | 83.0 |

TABLE 4

(NO$_x$-η400 data)

| A/F | 14.2 | 14.4 | 14.5 | 14.6 | 14.7 | 14.8 |
|---|---|---|---|---|---|---|
| λ (O excess) | 0.4 | 0.7 | 0.8 | 1.0 | 1.2 | 1.5 |
| Rh/ZrO$_2$ | 100.0 | 100.0 | 100.0 | 77.8 | 41.8 | 24.9 |
| Rh/ZrP$_2$O$_7$ | 97.8 | 97.8 | 98.0 | 92.4 | 77.5 | 60.0 |
| Rh/LaPO$_4$ | 100.0 | 100.0 | 100.0 | 87.9 | 59.0 | 39.6 |
| Rh/YPO$_4$ | 97.6 | 98.0 | 98.0 | 81.5 | 53.1 | 36.0 |
| Rh/AlPO$_4$ | 98.0 | 98.0 | 98.0 | 90.0 | 66.5 | 48.0 |

Similar to the L/O performance results, when a specific phosphate salt was used as an Rh carrier, all the tested samples exhibited an NO, removal performance under stoichiometric to lean conditions (λ=1, 1.2, and 1.5; A/F=14.6, 14.7, and 14.8), which was higher than that of the Rh-supporting zirconia of Comparative Example. The catalytic performance was enhanced in the following order: ZrO$_2$<LaPO$_4$<YPO$_4$<AlPO$_4$<ZrP$_2$O$_7$. As shown in the FT-IR chart (FIG. 1), a sample exhibiting higher NO$_x$ removal performance under a lean condition tends to form an aldehyde species as a HC reaction intermediate.

As described above, a conceivable mechanism of enhancement in NO$_x$ removal performance is as follows. Partial oxidation of C$_3$H$_6$ occurs on acid points of the phosphate salt under a lean condition (excess air ratio λ>1), and the formed aldehyde intermediate with high reactivity reacts with NO, whereby NO—C$_3$H$_6$ reaction is promoted.

Example 11 (0.4 wt. % Rh/5 Mol % LaPO$_4$/SiO$_2$)

The catalyst was synthesized through the method of Production Example 6. Raw materials were provided so as to attain a ratio of 5 mol % LaPO$_4$/SiO$_2$.

Subsequently, the powder having the above ratio was immersed in an aqueous Rh nitrate solution so that the amount of Rh was adjusted to 0.4 wt. %. The powder was then dried and fired at 500° C. for one hour, to thereby yield an exhaust gas purification catalyst.

Example 12 (0.4 wt. % Rh/10 Mol % LaPO$_4$/SiO$_2$)

The procedure of Example 11 was repeated, except that the raw materials were provided so as to attain a ratio of 10 mol % LaPO$_4$/SiO$_2$, to thereby yield an exhaust gas purification catalyst.

Example 13 (0.4 wt. % Rh/20 Mol % LaPO$_4$/SiO$_2$)

The procedure of Example 11 was repeated, except that the raw materials were provided so as to attain a ratio of 20 mol % LaPO$_4$/SiO$_2$, to thereby yield an exhaust gas purification catalyst.

Example 14 (0.4 wt. % Rh/30 Mol % LaPO$_4$/SiO$_2$)

The procedure of Example 11 was repeated, except that the raw materials were provided so as to attain a ratio of 30 mol % LaPO$_4$/SiO$_2$, to thereby yield an exhaust gas purification catalyst.

Example 15 (0.4 wt. % Rh/40 Mol % LaPO$_4$/SiO$_2$)

The procedure of Example 11 was repeated, except that the raw materials were provided so as to attain a ratio of 40 mol % LaPO$_4$/SiO$_2$, to thereby yield an exhaust gas purification catalyst.

Example 16 (0.2 wt. % Rh/20 Mol % LaPO$_4$/SiO$_2$)

The procedure of Example 13 was repeated, except that the amount of Rh was adjusted to 0.2 wt. %, to thereby yield an exhaust gas purification catalyst.

Example 17 (0.05 wt. % Rh/20 Mol % LaPO$_4$/SiO$_2$)

The procedure of Example 13 was repeated, except that the amount of Rh was adjusted to 0.05 wt. %, to thereby yield an exhaust gas purification catalyst.

Example 18 (0.01 wt. % Rh/20 Mol % LaPO$_4$/SiO$_2$)

The procedure of Example 13 was repeated, except that the amount of Rh was adjusted to 0.01 wt. %, to thereby yield an exhaust gas purification catalyst.

Example 21 (0.4 wt. % Rh/LaPO$_4$)

Through the synthesis method of Production Example 5, a target substance was produced.

Subsequently, the powder of the target substance was immersed in an aqueous Rh nitrate solution so that the amount of Rh was adjusted to 0.4 wt. %. The powder was then dried and fired at 500° C. for one hour, to thereby yield an exhaust gas purification catalyst.

Example 22 (0.2 wt. % Rh/LaPO₄)

The procedure of Example 21 was repeated, except that the amount of Rh was adjusted to 0.2 wt. %, to thereby yield an exhaust gas purification catalyst.

Example 23 (0.05 wt. Rh/LaPO₄)

The procedure of Example 21 was repeated, except that the amount of Rh was adjusted to 0.05 wt. %, to thereby yield an exhaust gas purification catalyst.

Example 24 (0.01 wt. % Rh/LaPO₄)

The procedure of Example 21 was repeated, except that the amount of Rh was adjusted to 0.01 wt. %, to thereby yield an exhaust gas purification catalyst.

Comparative Example 11 (0.4 wt. % Rh/SiO₂)

SiO₂ was immersed in a solution of hexaammine Rh hydroxide so that the amount of Rh was adjusted to 0.4 wt. %. Thus thus-treated SiO₂ was dried overnight at 120° C. and fired at 500° C. for one hour, to thereby yield an exhaust gas purification catalyst.

Comparative Example 12 (0.2 wt. % Rh/SiO₂)

The procedure of Comparative Example 11 was repeated, except that the amount of Rh was adjusted to 0.2 wt. %, to thereby yield an exhaust gas purification catalyst.

Comparative Example 13 (0.05 wt. % Rh/SiO₂)

The procedure of Comparative Example 11 was repeated, except that the amount of Rh was adjusted to 0.05 wt. %, to thereby yield an exhaust gas purification catalyst.

Comparative Example 14 (0.01 wt. Rh/SiO₂)

The procedure of Comparative Example 11 was repeated, except that the amount of Rh was adjusted to 0.01 wt. %, to thereby yield an exhaust gas purification catalyst.

<Method and Results of Catalyst Performance Evaluation>

The catalytic activity of the exhaust gas purification catalysts produced in Examples 1 to 5 and Comparative Examples 1 and 2 was evaluated in the following manner immediately after preparation (fresh) and after long-term use thereof under high-temperature conditions (aged). The long-term, high-temperature conditions were 25 hours and 900° C. in an atmospheric condition containing 10% steam.

In the evaluation, a fixed-bed, flow-type reactor was employed. Each catalyst powder was added to a reaction tube, and a perfect-combustion-simulated exhaust gas composed of CO: 0.51%, NO: 500 ppm, $C_3H_6$: 1,170 ppmC, and $O_2$: 0.4%, the balance being $N_2$, was caused to pass through the reaction tube so that the W/F (mass of catalyst/gas flow rate) was adjusted to $5.0 \times 10^{-4}$ g·min·cm$^{-3}$. The outlet gas was analyzed at 100 to 500° C. by means of a CO/HC/NO analyzer, to thereby evaluate light-off performance of the catalyst. From the results, the temperature at which 50% percent removal was attained (T50) was obtained. Specific surface area was measured through the $N_2$ adsorption method, and Rh dispersibility was measured through the CO adsorption method. Table 5 shows the results.

TABLE 5

Specific surface area, Rh dispersion, and exhaust gas purification performance of Rh-supporting catalysts (Rh = 0.4 wt. %)

| | | Fresh | | | | Aged (900° C. × 25 hours) | | | | |
|---|---|---|---|---|---|---|---|---|---|---|
| | | $S_{BET}$ | Rh dispersion | T50 (° C.) | | | $S_{BET}$ | Rh dispersion | T50 (° C.) | | |
| Rh = 0.4 wt. % | | m²/g | % | CO | NO | $C_3H_6$ | m²/g | % | CO | NO | $C_3H_6$ |
| Comp. Ex. 11 | SiO₂ (0 mol % LaPO₄/SiO₂) | 310.0 | 58.0 | 248 | 263 | 261 | 154.0 | — | 348 | 352 | 362 |
| Ex. 11 | 5 mol % LaPO₄/SiO₂ | 51.3 | 24.3 | 225 | 233 | 244 | 46.9 | 2.9 | 343 | 349 | 355 |
| Ex. 12 | 10 mol % LaPO₄/SiO₂ | 41.7 | 25.3 | 236 | 243 | 254 | 36.4 | 4.0 | 297 | 305 | 315 |
| Ex. 13 | 20 mol % LaPO₄/SiO₂ | 49.6 | 20.0 | 238 | 245 | 256 | 39.6 | 5.6 | 287 | 297 | 313 |
| Ex. 14 | 30 mol % LaPO₄/SiO₂ | 55.1 | 26.8 | 234 | 242 | 261 | 37.1 | 3.8 | 301 | 311 | 322 |
| Ex. 15 | 40 mol % LaPO₄/SiO₂ | 59.7 | 33.3 | 228 | 234 | 255 | 32.6 | 4.8 | 308 | 319 | 331 |
| Ex. 21 | LaPO₄ | 44.5 | 22.4 | 259 | 259 | 287 | 33.3 | 3.7 | 317 | 327 | 345 |

Regarding exhaust gas purification performance in the fresh state, LaPO₄ (Examples 11 to 15: 5 mol % to 40 mol % LaPO₄/SiO₂), in which lanthanum phosphate was dispersed and deposited on SiO₂, exhibited a low T50 with respect to CO/NO/$C_3H_6$, as compared with Comparative Example 11 and Example 21, indicating that the catalyst samples of Examples 11 to 15 exhibited high catalytic activity. Regarding exhaust gas purification performance in the aged state, LaPO₄ (Examples 12 to 15: 10 mol % to 40 mol % LaPO₄/SiO₂) exhibited a low T50 with respect to CO/NO/$C_3H_6$, as compared with Comparative Example 11 and Example 21, indicating that the catalyst samples of Examples 12 to 15 exhibited high catalytic activity. Conceivable reasons for attaining high catalyst performance are the effect of large specific surface area realized by dispersing and depositing LaPO₄ on SiO₂, and that of suppression of sintering between LaPO₄ particles. Particularly in Examples 12 to 15, the effects are thought to be remarkably attained to attain Rh dispersibility in the aged state, as compared with Comparative Example 11.

As described above, LaPO₄ is more preferably dispersed and deposited on SiO₂, and the LaPO₄ content is preferably 5 mol % to 40 mol %, more preferably 10 mol % to 40 mol %.

The exhaust gas purification catalysts produced in Examples 13, and 16 to 18, Comparative Examples 11 to 14, and Examples 21 to 24 were subjected to long-term, high-temperature treatment (25 hours, 900° C., in an atmospheric condition containing 10% steam). The catalytic activity was evaluated immediately after preparation thereof and after the long-term, high-temperature treatment, in the aforementioned manner. Table 6 shows T50 values of the tested catalysts with respect to NO.

TABLE 6

$NO_x$-T50 at varied Rh concentrations

| Rh concentration (wt. %) | 20 mol % $LaPO_4/SiO_2$ | $SiO_2$ | $LaPO_4$ |
|---|---|---|---|
| 0.4 | Ex. 13: 297 | Comp. Ex. 11: 352 | Ex. 21: 327 |
| 0.2 | Ex. 16: 307 | Comp. Ex. 12: 383 | Ex. 22: 344 |
| 0.05 | Ex. 17: 360 | Comp. Ex. 13: 473 | Ex. 23: 361 |
| 0.01 | Ex. 18: 446 | Comp. Ex. 14: 559 | Ex. 24: 479 |

The catalyst (support: 20 mol %. $LaPO_4/SiO_2$) was found to exhibit higher catalytic performance, as compared with an Rh-supporting $LaPO_4$ catalyst and an Rh-supporting $SiO_2$ catalyst, even at a low Rh concentration.

The catalysts of Example 13, Comparative Example 11, and Example 21 were similarly evaluated, while the temperature of long-term, high-temperature treatment was varied. Table 7 shows T50 values of the tested catalysts with respect to NO.

TABLE 7

$NO_x$-T50 at varied aging temperatures

| Aging temp. (° C.) | Ex. 13 20 mol % $LaPO_4/SiO_2$ | Comp. Ex. 11 $SiO_2$ | Ex. 21 $LaPO_4$ |
|---|---|---|---|
| 800 | 245 | 263 | 287 |
| 900 | 297 | 352 | 344 |
| 1,000 | 343 | 422 | 389 |
| 1,100 | 329 | 387 | 330 |
| 1,200 | — | — | — |

*: "—" means a percent purification less than 50%

The catalyst (support: 20 mol % $LaPO_4/SiO_2$) was found to exhibit higher catalytic performance, as compared with an Rh-supporting $LaPO_4$ catalyst and an Rh-supporting $SiO_2$ catalyst, at any temperature of long-term, high-temperature treatment.

The invention claimed is:

1. An exhaust gas purification catalyst, comprising:
   a carrier; and
   a noble metal at least containing Rh deposited on the carrier,
   wherein the carrier consists of a zirconium phosphate salt represented by formula $ZrP_2O_7$; and
   the Rh is deposited on the carrier in an amount, as reduced to the mass of metallic Rh and based on the mass of the carrier, of 0.05 to 2 mass %.

2. An exhaust gas purification catalyst product, comprising a catalyst support made of a ceramic or metallic material, and a layer of an exhaust gas purification catalyst as recited in claim 1, the layer being supported on the catalyst support.

3. An exhaust gas purification catalyst, comprising:
   a carrier; and
   a noble metal at least containing Rh deposited on the carrier,
   wherein the carrier consists of a mixture of a molar amount of $SiO_2$ powder and a molar amount of a phosphate salt represented by formula:

$MPO_4$, wherein M represents La;
   a molar ratio of the molar amount of phosphate salt relative that of a total molar amount of the molar amount of $SiO_2$ and the molar amount of the phosphate salt is 5 to 40 mol %; and
   the Rh is deposited on the carrier in an amount, as reduced to the mass of metallic Rh and based on the mass of the carrier, of 0.05 to 2 mass %.

4. An exhaust gas purification catalyst product, comprising a catalyst support made of a ceramic or metallic material, and a layer of an exhaust gas purification catalyst as recited in claim 3, the layer being supported on the catalyst support.

* * * * *